(12) United States Patent
Kim et al.

(10) Patent No.: US 7,400,607 B2
(45) Date of Patent: Jul. 15, 2008

(54) METHOD AND APPARATUS FOR BIT SCRAMBLING FOR PACKET TRANSMISSION/RECEPTION IN A WIRELESS COMMUNICATION SYSTEM

(75) Inventors: Noh-Sun Kim, Suwon-si (KR); Hun-Kee Kim, Seoul (KR); Gin-Kyu Choi, Seoul (KR); Hea-Kyoung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 10/985,884

(22) Filed: Nov. 12, 2004

(65) Prior Publication Data

US 2005/0108610 A1  May 19, 2005

(30) Foreign Application Priority Data

Nov. 13, 2003 (KR) .................. 10-2003-0080350

(51) Int. Cl.
*H04B 7/216* (2006.01)
*G08C 25/02* (2006.01)

(52) U.S. Cl. .................. 370/335; 714/748

(58) Field of Classification Search ........ 370/335, 370/514; 714/748

See application file for complete search history.

(56) References Cited

U.S. PATENT DOCUMENTS

| 4,232,193 | A | 11/1980 | Gerard | |
|---|---|---|---|---|
| 6,618,395 | B1 | 9/2003 | Kimmitt | |
| 7,042,858 | B1 * | 5/2006 | Ma et al. | 370/331 |
| 2002/0080887 | A1 | 6/2002 | Jeong et al. | 375/295 |
| 2003/0147422 | A1 | 8/2003 | You et al. | |
| 2003/0161471 | A1 | 8/2003 | Jou et al. | |
| 2004/0001429 | A1 * | 1/2004 | Ma et al. | 370/210 |
| 2004/0022238 | A1 * | 2/2004 | Kimmitt | 370/366 |
| 2006/0277404 | A1 * | 12/2006 | Jones et al. | 713/2 |

FOREIGN PATENT DOCUMENTS

| JP | 10-341200 | 12/1998 |
|---|---|---|
| JP | 2000-004242 | 1/2000 |
| JP | 2000069544 | 3/2000 |

(Continued)

OTHER PUBLICATIONS

Sorour Falahati and Arne Svensson; Hybrid Type-II ARQ Schemes with Adaptive Modulation Systems for Wireless Channels; Communication Systems Group, Department of Signals and Systems, Chalmers University of Technology; pp. 2691-2695.

(Continued)

*Primary Examiner*—Nick Corsaro
*Assistant Examiner*—Michael Faragalla
(74) *Attorney, Agent, or Firm*—Roylance, Abrams, Berdo & Goodman, L.L.P.

(57) ABSTRACT

A bit scrambling method and apparatus for packet transmission/reception in a wireless communication system are provided. A transmitter performs bit scrambling before CRC attachment and a receiver performs bit descrambling after a CRC check. This enables termination of iterative decoding at a turbo decoder according to the CRC check. Hence, power consumption is reduced and throughput is increased at a receiver.

8 Claims, 8 Drawing Sheets

FOREIGN PATENT DOCUMENTS

| | | |
|---|---|---|
| JP | WO 00/52832 | 9/2000 |
| WO | WO 00/36796 | 6/2000 |

OTHER PUBLICATIONS

Hybrid Type-II ARQ Schemes with Adaptive Modulation Systems for Wireless Channels; Sorour Falahati et al.; Communication Systems Group, Department of Signals and Systems, Chalmers University of Technology, SE-412 96 Goteborg, Sweden; pp. 2691-2695.

A Hybrid ARQ Scheme Using RCPT Codes and Its Performances over Rayleigh Fading Channel; Xiu Chundi et al; Beijing University of Aeronautics & Astronautics; pp. 1517-1521.

XP-002388840; Grundlagen der Kryptographie; Geschichte et al.; pp. 1-35.

3GPP TR 25.858 V5.0.0(Mar. 2002); XP-002265002; $3^{rd}$ Generation Partnership Project; Technical Specification Group Radio Access Network; High Speed Downlink Packet Access: Physical Layer Aspects (Release 5); pp. 1-31.

XP-000894166 Adaptive Modulation/TDMA/TDD with Convolutionally Coded Type-II Hybrid ARQ for Wireless Communication Systems; Masashi Naijoh et al.; Wireless Personal Communications 13: 203-222, 2000.

Citation 1; 3GPP TS 25.212 V5.5.0 (Jun. 2003); $3^{rd}$ Generation Partnership Project; Technical Specification Group Radio Access Network; Multiplexing and channel coding (FDD) (Release 5); 74 pgs.

* cited by examiner

METHOD AND APPARATUS FOR BIT SCRAMBLING FOR PACKET TRANSMISSION/RECEPTION IN A WIRELESS COMMUNICATION SYSTEM

PRIORITY

This application claims priority under 35 U.S.C. § 119(a) to an application entitled "Method and Apparatus for Bit Scrambling for Packet Transmission/Reception in a Wireless Communication System" filed in the Korean Intellectual Property Office on Nov. 13, 2003 and assigned Ser. No. 2003-80350, the entire contents of which are expressly incorporated herein by reference.

BACKGROUND OF THE INVENTION

1. Field of the Invention

The present invention relates generally to a wideband code division multiple access) (WCDMA wireless communication system. In particular, the present invention relates to a method and apparatus for carrying out bit-scrambling/descrambling in the media access control-high speed (MAC-hs) layer of a transmitter/receiver for high-speed packet transmission/reception.

2. Description of the Related Art

Mobile communication systems have evolved from voice-focused service in its initial developmental stage to high-speed, high-quality wireless packet data transmission for provisioning of data service and multimedia service. The standardization work dedicated to high speed downlink packet access (HSDPA) and 1xEV-DV (Evolution-Data and Voice) mainly by 3GPP ($3^{rd}$ Generation Partnership Project) and 3GPP2 is a clear evidence of efforts to find a solution to 2 Mbps or higher-speed, high-quality wireless data packet transmission. $4^{th}$ generation mobile communication systems aim to provide higher-speed, higher-quality multimedia service.

In wireless communications, the radio channel environment is an obstacle to high-speed, high-quality data service. The radio channel environment varies often due to fading-induced signal power change, shadowing, Doppler effects caused by mobile movement and frequent mobile velocity changes, interference from other users, and multipath interference as well as additive white gaussian noise (AWGN). Thus it follows that advances in technology are needed to improve adaptability to the channel environment beyond the technologies of the existing $2^{nd}$ and $3^{rd}$ generation mobile communication systems in order to provide the high-speed wireless data packet service. Although fast power control adopted in the existing systems improves the adaptability to the channel environment, both 3GPP and 3GPP2 are dedicated to standardization of a high-speed data packet transmission system. Both standards commonly address adaptive modulation and coding scheme (AMCS) and hybrid automatic repeat request (HARQ).

The AMCS is a method of changing a modulation scheme and a coding rate adaptively according to the change of a downlink channel environment. Generally, a user equipment (UE) measures the signal-to-noise ratio (SNR) of a downlink signal and reports it to a Node B. The Node B then estimates the downlink channel environment based on the SNR information and decides an appropriate modulation scheme and coding rate according to the estimation. Therefore, a system using the AMCS applies a higher-order modulation scheme such as 16 QAM (quadrature amplitude modulation) or 64 QAM and a high coding rate such as ¾ to a UE near to a Node B, that is, a UE in a good channel status. To a UE at a cell boundary, that is, a UE in a bad channel status, the system applies a lower-order modulation scheme such as BPSK (binary phase shift keying), QPSK (quadrature psk), or 8 PSK (8-ary PSK) and a low coding rate such as ½. The AMCS improves system performance on the average by reducing interference relative to the conventional fast power control method.

The HARQ is a scheme that, when an error is generated in an initially transmitted data packet, retransmits the packet to compensate for the error. The HARQ scheme can be further categorized as either chase combining (CC), full incremental redundancy (FIR), and partial incremental redundancy (PIR) methods for error compensation.

In the CC method of error compensation, the same packet that was initially transmitted is retransmitted in its entirety. A receiver combines the retransmitted packet and the buffered initially transmitted packet according to a predetermined method, thereby increasing the reliability of the coded bits input to a decoder and thus achieving a total system performance gain. The combining of the same two packets gives the effect of repetition coding. Hence, an average performance gain of about 3 dB is achieved.

The FIR method of error compensation improves decoding performance at the receiver by transmitting a packet comprising parity bits generated from a channel encoder instead of the same initially transmitted packet. The decoder uses the new parity bits as well as the initial transmission information. The resulting decrease in coding rate increases decoding performance. It is well known in coding theory that a performance gain at a low coding rate is higher than that achieved from repetition coding. Thus, the FIR offers good performance over the CC in terms of performance gain.

Unlike the FIR, the PIR method of error compensation transmits a data packet comprised of information bits and new parity bits during retransmission. During decoding, the initially transmitted information bits are combined with the retransmitted information bits, leading to the effect of the CC method of error compensation, and the use of the parity bits leads to the effect of the FIR method of error compensation. The PIR uses a higher coding rate than the FIR. Thus, the PIR generally stands between the FIR and the CC in terms of performance.

While the AMC and HARQ are independent techniques to increase adaptability to the change of links, a combination of them can improve the system performance considerably. That is, a transmitter in a Node B decides a modulation scheme and a coding rate for a channel encoder adaptively according to the downlink channel status and transmits a data packet correspondingly. A receiver in a UE, if it fails to decode the data packet, requests a retransmission. The Node B retransmits a predetermined data packet in a predetermined HARQ scheme in response to the retransmission request.

Figure 1:
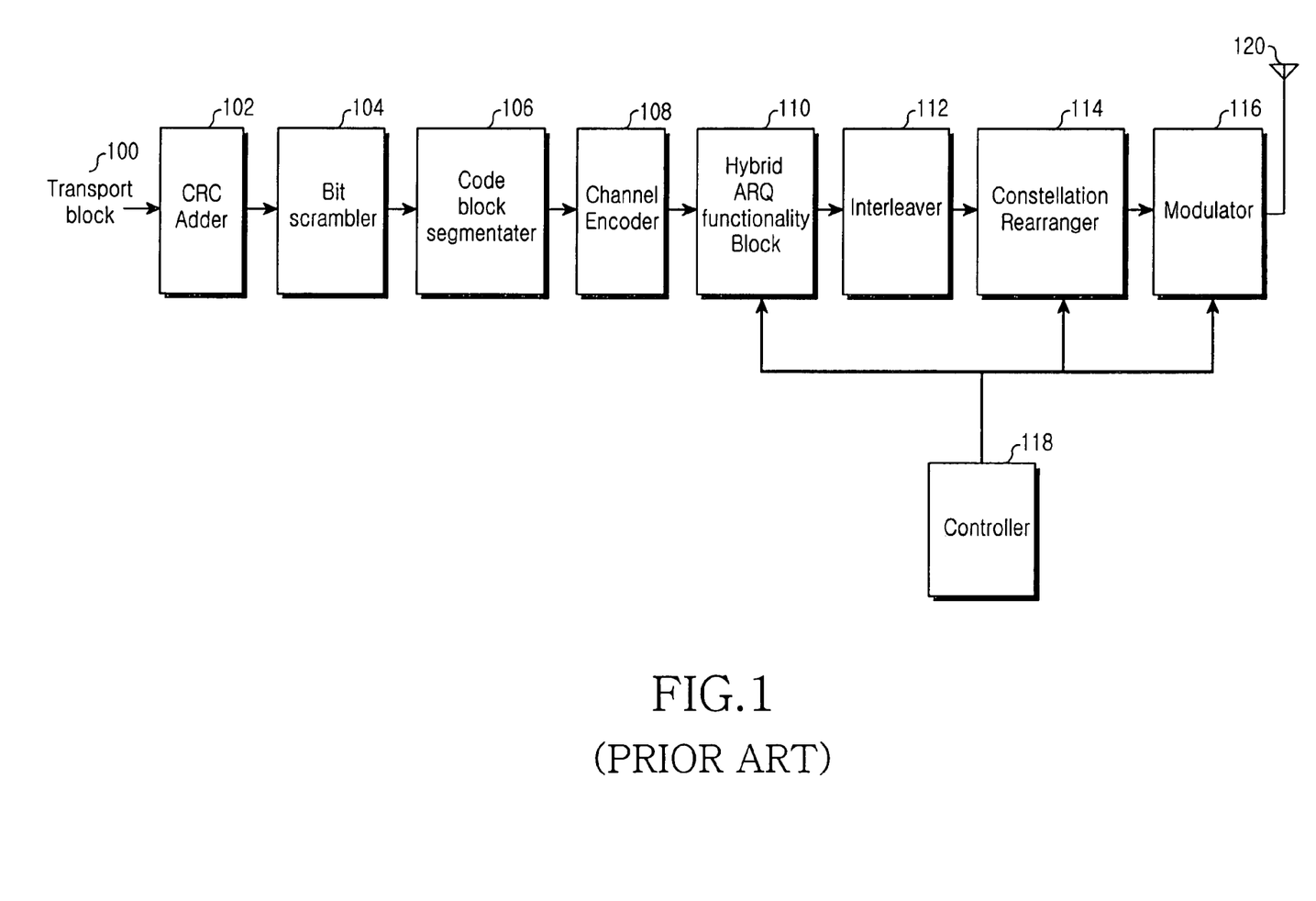
FIG. 1 is a block diagram of a transmitter in a conventional mobile communication system for high-speed downlink packet transmission.

FIG. 1 is a block diagram of the physical layer configuration of a conventional transmitter for high-speed packet data transmission. As illustrated in FIG. 1, the transmitter is comprised of a cyclic redundancy check (CRC) adder 102, a bit scrambler 104, a code block segmenter 106, a channel encoder 108, an HARQ functionality block 110, an interleaver 112, a constellation rearranger 114, a modulator 116, a controller 118, and a transmit antenna 120.

Referring to FIG. 1, a transport block 100 received from a higher media access control (MAC) layer is attached with a CRC code in the CRC adder 102 and provided to the bit scrambler 104. The structure of the transport block 100 will be described below.

For an high speed-downlink shared channel (HS-DSCH), a protocol data unit (PDU) generated in the MAC layer includes a MAC-hs header and one or more MAC-hs service data units (SDUs). Notably, a MAC-hs SDU is equivalent to a MAC-d PDU. Only one MAC-hs PDU is transmittable to one UE for one transmission time interval (TTI) and the MAC-hs header is of a variable length. MAC-hs SDUs in one TTI are in the same reordering queue.

The bit scrambler 104 scrambles the CRC-attached transport block with a predetermined initial value on a per-bit basis. The scrambled bits are provided to the channel encoder 108 via the code block segmenter 106. If the size of the input data exceeds the maximum number of bits that can be input to the channel encoder 108, the code block segmenter 106 segments the data by the maximum bit number.

After a turbo coding on the input bits, the channel encoder 108 outputs coded bits comprising a systematic part representing the input bits and a parity part representing parity bits for error correction of the systematic part. The channel encoder (turbo encoder) 108 encodes the input bits at least one coding rate such as ½, ¾ and the like. Alternatively, the channel encoder 108 may have a mother coding rate of ⅙ or ⅕ so as to support a plurality of coding rates through puncturing or repetition. In this case, an operation for deciding one of the coding rates is needed.

The HARQ functionality block 110 includes a rate-matching operation of the coded bits to a predetermined data rate. The rate matching is done by repetition or puncturing of the coded bits, when the number of the coded bits is not equal to that of bits transmittable over the air. The interleaver 112 interleaves the rate-matched coded bits.

The constellation rearranger 114 rearranges the interleaved bits and the modulator 116 maps the rearranged bits to modulation symbols in a modulation scheme of an M-ary PSK or M-ary QAM. The modulation symbols are transmitted through the transmit antenna 120. The constellation rearranger 114 distinguishes the systematic part of the interleaved bits from the parity part thereof and allocates the systematic part to a high-reliability position and the parity part to a low-reliability position. Also, the constellation rearranger 114 distinguishes initial transmission bits from retransmission bits and maps the initial transmission bits to modulation symbols with a low error probability and the retransmission bits to modulation symbols with a high error probability.

Meanwhile, the controller 118 controls the coding rate of the channel encoder 108, the rate matching of the HARQ functionality block 110, and the modulation scheme of the modulator 116 according to the current radio channel status. In the case of an HSDPA wireless communication system, the controller 118 supports the AMCS.

Figure 2:
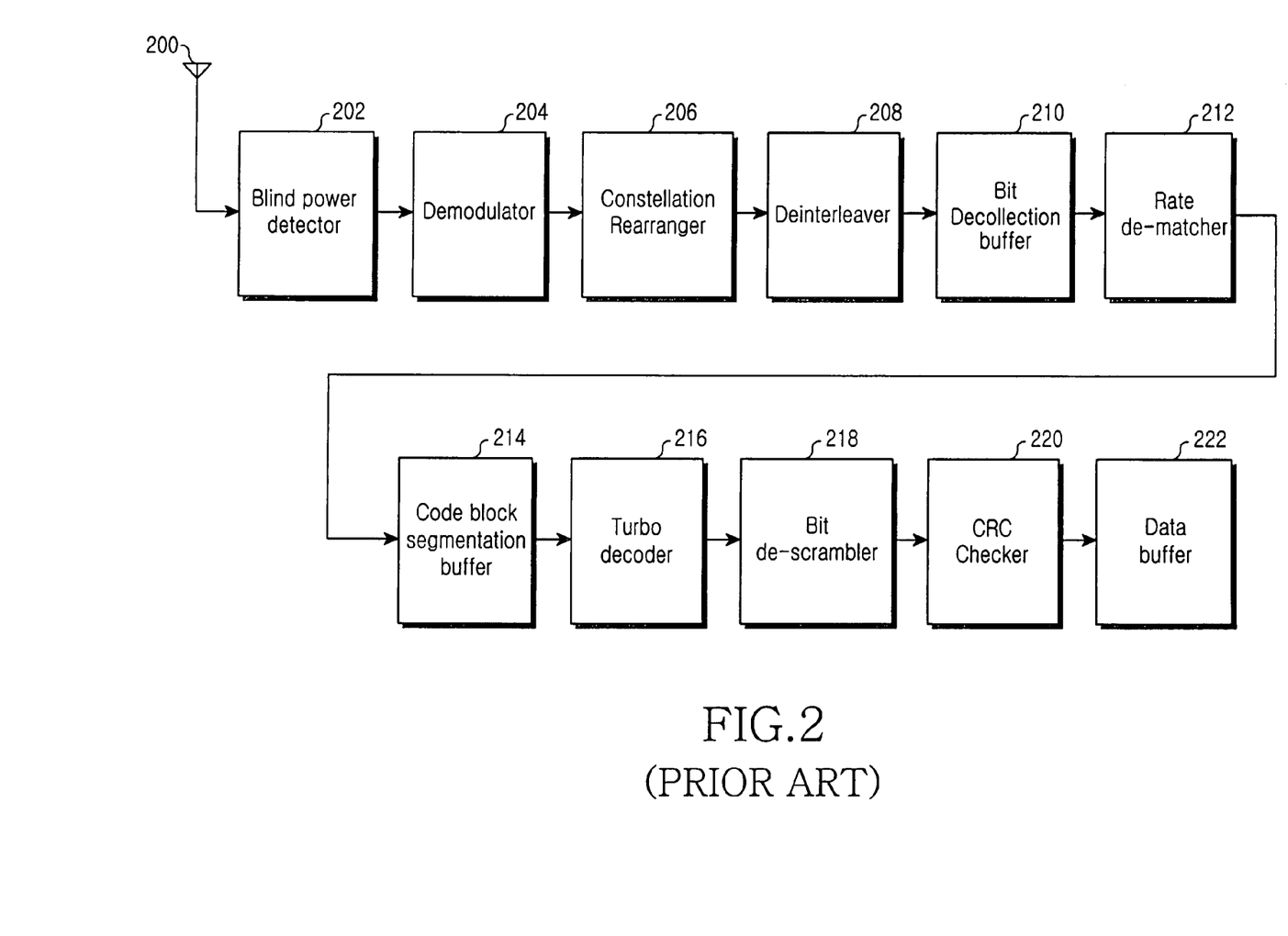
FIG. 2 is a block diagram of a receiver in the conventional mobile communication system for high-speed downlink packet transmission.

With reference to FIG. 2, the structure of a conventional receiver for high-speed packet data reception will be described. As illustrated in FIG. 2, the receiver is comprised of a receive antenna 200, a blind power detector (BPD) 202, a demodulator 204, a constellation rearranger 206, a deinterleaver 208, a bit decollection buffer 210, a rate dematcher 212, a code block desegmentation buffer 214, a turbo decoder 216, a bit descrambler 218, a CRC checker 220, and a data buffer 222.

Referring to FIG. 2, the BPD 202 estimates the pilot-to-traffic power ratio of a signal received through the receive antenna 200. The demodulator 204 extracts a bit stream from the input symbol sequence based on the estimated power ratio. The constellation rearranger 206 rearranges the bit streams to output rearranged coded bits. The deinterleaver 208 deinterleaves the rearranged coded bits in correspondence with the interleaving of the interleaver 112 in the transmitter. The deinterleaved bits are applied to the input of the turbo decoder 216 via the bit decollection buffer 210, the rate dematcher 212, and the code block desegmentation buffer 214. The turbo decoder 216 extracts information bits by separating the received bits into a systematic part and a parity part.

In a $3^{rd}$ generation communication system, the transmitter transmits a preset pilot signal on a common pilot channel that all users can receive. The receiver estimates channel characteristics, especially fading using the pilot signal. The estimated channel characteristics are used to recover a signal distorted by the fading to a original signal and also to estimate the pilot to traffic power ratio.

The pilot to traffic power ratio estimation is an essential process for successful demodulation of a signal modulated in a higher-order modulation scheme such as 16 QAM or 64 QAM. If the transmitter notifies receiver of the power ratio, the power ratio estimation is not needed. Yet, in a general high-speed packet transmission system like 1xEV-DV or HSDPA using a modulation scheme with an order equal to or higher than 16 QAM, the receiver is supposed to estimate the power ratio to relieve signal load. Receiving the power ratio estimation at the receiver instead of receiving the power ratio by signaling is called blind power ratio detection. In the case where the transmit power of the transmitter is non-uniform, the use of the pilot-to-traffic power ratio in demodulation may cause problems.

The situation of non-uniform average power in the transmitter will be discussed below. High-order modulation symbols have different power levels. In 16 QAM, the power of the four inner symbols close to the origin (0, 0) is given as $P^{in}=2A^2$ on a coordinate plane having in-phase (I) component and quadrature-phase (Q) components along x and y axes. For the eight middle symbols, $P_{middle}=10A^2$ and for the four outer symbols, $P_{outer}=18A^2$. A denotes the distance between each inner symbol and the axes. Thus, the total average power of the three types of symbols is given by $P_{total}=(2A^2+10A^2+18A^2)/3=10A^2$. If A is 0.3162, $P_{total}=1$.

Let a data symbol transmitted on a data channel be denoted by $S_d$, and a pilot symbol transmitted on a pilot channel be denoted by $S_p$, If the power of a symbol is <S>, a transmitted signal Tx from the transmitter is expressed as $$Tx = W_d A_d S_d + W_p A_p S_p \qquad (1)$$

where W denotes Walsh spreading codes by which the data channel is distinguished from the pilot channel, A denotes the channel gains of the data and pilot channels, and S denotes traffic data symbols and pilot symbols in a packet. The pilot symbols $S_p$ follow a preset pattern between the transmitter and the receiver.

The high-speed packet transmission system transmits the signal Tx in packets, wherein each packet is loaded a plurality of slots. One slot duration is 0.667 ms and the number of symbols per slot varies depending on the spreading factor (SF) of the slots. For asynchronous HSDPA, one packet uses three slots and 480 symbol are transmitted per packet for a SF=16.

Therefore, since one modulation symbol is comprised of four bits, 1920 bits are randomly generated in 16 QAM. In QPSK, one symbol is comprised of two bits and thus 960 bits are generated. If 120 inner symbols, 240 middle symbols, and 120 outer symbols are uniformly generated for transmission of 480 symbols, the average power of the 480 symbols, $<S_i>$ is 1. However, all the symbols are not always uniformly generated in real transmission. In an extreme case where 1920 bits are generated to be all 0s, all the symbols are A+jA inner symbols, resulting in $<S_i>=0.2$. The receiver also estimates the average power to be 0.2, not 1, despite the absence of noise or distortion. On the contrary, if all the bits are 1s, the symbols are 3A+j3A outer symbols and $<S_i>$ is 1.8.

The characteristics of the non-uniform average power will be described in terms of probability density function (PDF) as follows. Given a total transmit power of 1, then 90% of the total transmit power ($A_d^2=0.9$) or the average power of the traffic channel, is 0.9 ($P=A_d^2<S_i>=A_d^2$) in the case where the three types of symbols (inner symbols, middle symbols and outer symbols) are perfectly uniformly generated. Yet, the traffic channel exhibits a power distribution with m=0.9 and σ=0.0232 where m is the mean power and σ is the standard deviation.

If the traffic channel occupies 90% of the total transmit power ($A_d^2=0.9$), the average symbol power $<S_i>$ is 0.8, and noise is generated with a power of 0.2 ($<N>=0.2$), the received power of an AWGN channel is calculated in a general blind power ratio detecting method. The method of detecting an accumulated average of the traffic channel can be expressed by $$Rx = W_d A_d S_d + W_p A_p S_p + N \quad (2)$$

After separating the pilot channel by Walsh decovering, the power remains:

$$Rx_d = A_d S_d + N \quad (3)$$

To achieve $A_d$, the accumulated average power is calculated by $$P = A_d^2 <S_d> + <N> \quad (4)$$

In an ideal case where $<S_d>$ is 1 and $<N>$ is 0, $P=A_d^2=0.9$ by Eq. (4). However, as described before, if $<S_d>$ is 0.9 and $<N>$ is 0.2, $P=A_d^2<S_d>+<N>=1.01$. Since $P \neq A_d^2$, $A_d^2$ cannot be achieved accurately.

As described above, when transmission symbols are uniformly created on a 16 QAM signal constellation, an accurate symbol boundary $A_d$ can be estimated by effectively estimating the pilot to traffic power ratio. Other-wise, the symbol boundary $A_d$ cannot be estimated accurately, thereby degrading performance at demodulation. The performance decrease is estimated to be 1.0 to 1.5 dB.

Accordingly, the bit scrambler 104 and the bit descrambler 218 are used to solve the problem of non-uniform transmit power. The bit scrambler 104 operates input bits with a predetermined initial value in the manner that converts non-uniform input bits concentrated on 1 or 0 to have a uniform distribution of 1's and 0's. The bit descrambler 218 performs the reverse of the bit scrambling on the received bits to thereby recover the original bits.

Regarding decoding at the receiver, the turbo decoder 216 extracts information bits more accurately by iterative decoding. Yet, too many occurrences of iteration lead to decoding delay and power consumption. Thus, the iterative decoding of the turbo decoder 216 is limited to a predetermined maximum number. However, if normal data recovery is achieved before the maximum number of iterations, the iterative decoding is terminated so that the process delay and power consumption of the turbo decoder 216 can be reduced considerably. To do so, a CRC check on decoder output can be served as a criterion to terminate the iterative decoding.

To determine whether to terminate the iterative decoding by the CRC check, first, all code blocks must include CRC bits to allow a CRC check in the turbo decoder. This condition is partially satisfied in the HSDPA system. When a higher-layer transport block size (TBS) is shorter than or equal to a maximum length for turbo coding (that is, 5114), the condition is satisfied. If the TBS is longer than 5114, the transport block is segmented into a plurality of code blocks and each code block cannot include a CRC. In this case, the above condition is not satisfied.

Secondly, when determining whether to terminate the iterative decoding by the CRC check, in a conventional system, a receiver cannot perform a CRC check without bit scrambling because a transmitter performs bit scrambling after CRC attachment. Therefore, the CRC check-based iterative decoding termination is not viable. To use the CRC check-based iterative decoding termination scheme in the turbo decoder 216, the bit scrambler 218 must be incorporated into the turbo decoder 216.

It is not easy, however, to include the bit descrambler 218 within the turbo decoder 216. Moreover, in a structure having the turbo decoder 216 separated from the bit scrambler 218, the turbo decoder 216 must be modified to feed back the output of the bit descrambler 218 to the input of the turbo decoder 216.

Hence, there is a need for a transmission/reception system in which the CRC check-based iterative decoding termination scheme can be applied using the existing turbo decoder structure.

SUMMARY OF THE INVENTION

An object of the present invention is to substantially solve at least the above problems and/or disadvantages and to provide at least the advantages below. Accordingly, an object of the present invention is to provide a method and apparatus for using a CRC check-based iterative decoding termination scheme without modifying the structure of a turbo decoder in a wireless communication system.

Another object of the present invention is to provide a method and apparatus for performing bit scrambling before CRC attachment to input bits in a wireless communication system.

A further object of the present invention is to provide a method and apparatus for descrambling input bit-scrambled bits so that a CRC check-based iterative decoding termination scheme can be used in a turbo decoder in a wireless communication system.

The above objects are achieved by providing a bit scrambling method and apparatus for packet transmission/reception in a wireless communication system.

According to one aspect of the present invention, in a method of transmitting packet data in a mobile communication system using an HARQ (hybrid automatic repeat request) and a high-order modulation scheme, data bits included in a transport block are bit-scrambled and attached with an error correction code. The error correction code-attached transport block is channel-encoded on a per-coding block basis, modulated, and transmitted.

According to another aspect of the present invention, in a method of receiving packet data in a mobile communication system using an HARQ scheme and a high-order modulation scheme, a received signal is demodulated in correspondence with a modulation scheme used in a transmitter, the demodulated data is converted to coding blocks, each of the encoder blocks is channel-decoded, and the data bits are output. The method according to an aspect of the present invention determines whether errors are generated in the data bits using an error correction code included in the data bits and the coding block is iterative decoded until no errors are detected in the determination. If no errors are detected in the determination, the data bits except the error correction code are bit-scrambled.

BRIEF DESCRIPTION OF THE DRAWINGS

The above and other objects, features and advantages of the present invention will become more apparent from the following detailed description when taken in conjunction with the accompanying drawings in which.

A DETAILED DESCRIPTION OF THE EXEMPLARY EMBODIMENT

An exemplary embodiment of the present invention will be described herein below with reference to the accompanying drawings. In the following description, well-known functions or constructions are not described in detail for purposes of conciseness.

In accordance with the present invention, a transmitter performs bit scrambling before CRC attachment so that a receiver can use a CRC check as a criterion to terminate iterative decoding in a wireless communication system. A bit descrambling is performed on CRC-checked bits.

Figure 3:
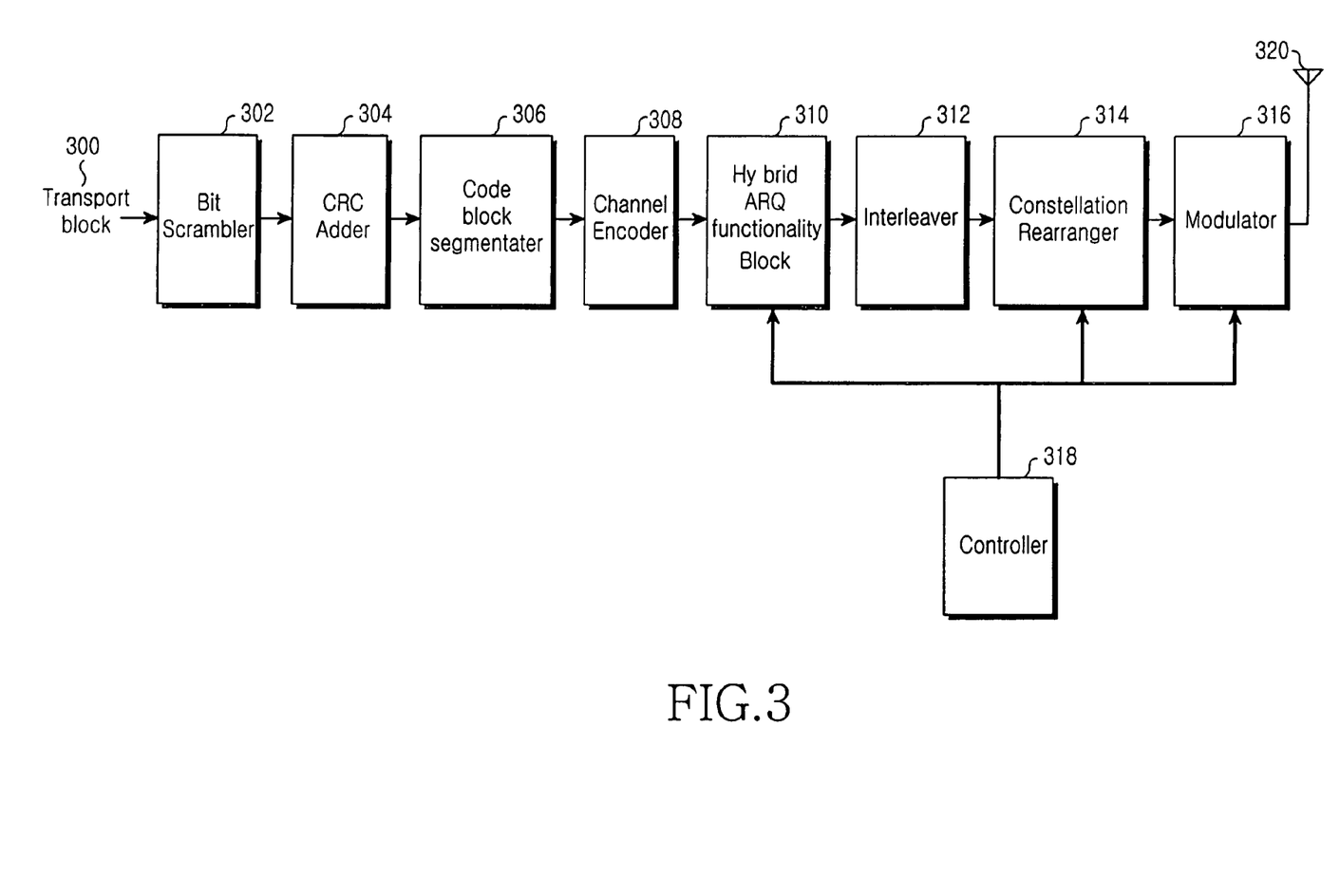
FIG. 3 is a block diagram of a transmitter in a mobile communication system for high-speed downlink packet transmission according to an embodiment of the present invention.

FIG. 3 is a block diagram of a transmitter for high-speed packet data transmission according to an embodiment of the present invention. As illustrated in FIG. 3, the transmitter is comprised of a bit scrambler 302, a CRC adder 304, a code block segmenter 306, a channel encoder 308, an HARQ functionality block 310, an interleaver 312, a constellation rearranger 314, a modulator 316, a controller 318, and a transmit antenna 320. While the bit scrambler 302 and the other components are shown to be in the same layer, according to one embodiment of the present invention, the bit scrambler 302 can be in a higher MAC layer, while the other components are in a physical layer.

Referring to FIG. 3, the MAC layer scrambles the bits of a transport block by the bit scrambler 302. The CRC adder 304 then attaches a CRC to the scrambled transport block and provides it to the code block segmenter 306. The scrambled transport block will be described in greater detail.

Figure 4:
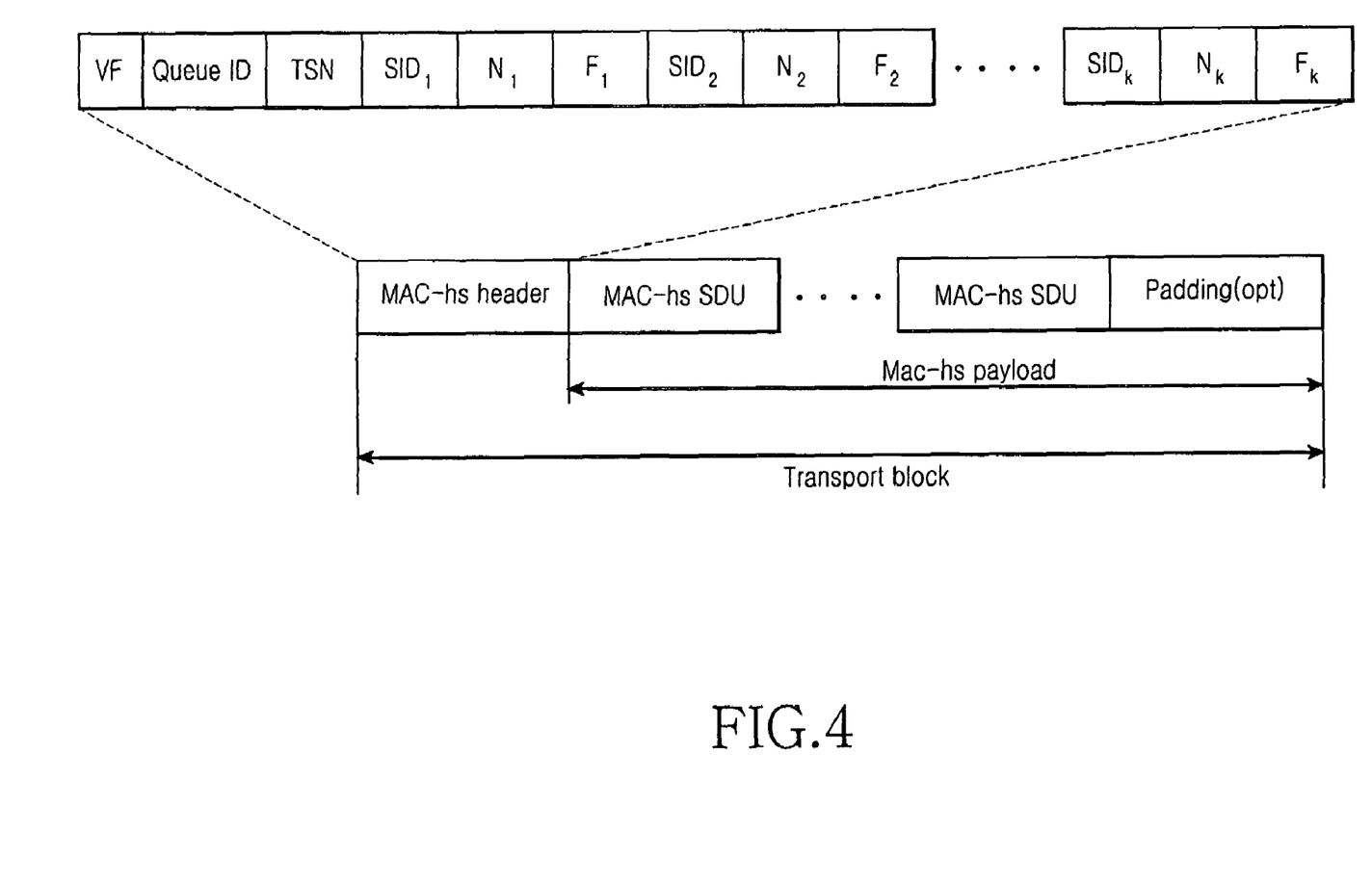
FIG. 4 illustrates a structure of a MAC-hs PDU used for general high-speed downlink packet transmission according to an embodiment of the present invention.

For an HS-DSCH, a PDU generated in the MAC layer includes a MAC-hs header and one or more MAC-hs SDUs, as illustrated in FIG. 4. Here, a MAC-hs SDU is equivalent to a MAC-d PDU. Only one MAC-hs PDU is transmittable to one UE for one TTI and the MAC-hs header is of a variable length. MAC-hs SDUs in one TTI are in the same reordering queue.

The MAC-hs header includes parameters of MAC PDUs for the HS-DSCH. The MAC PDU parameters are as follows.

Version Flag (VF): This is a one-bit flag indicating that the format of the MAC-hs format can be expanded. The VF must be set to 0, not 1 in the current protocol version.

Queue Identifier (Queue ID): The Queue ID identifies a reordering queue independent of a buffer that manages data in another reordering queue in the receiver. This field is 3 bits.

Transmission Sequence Number (TSN): The TSN is the transmission sequence number of the HS-DSCH. It is used for reordering to support successive transmission to a higher layer. This field is 6 bits.

Size Index Identifier (SID): The SID indicates the sizes of successive MAC-d PDUs. An SID representing the size of a MAC-d PDU is created in a higher layer and it is independent of the Queue ID. The SID field is 3 bits.

N: N indicates the number of successive MAC-d PDUs of the same size. It is 7 bits. In an FTD (Frequency Division Duplex) mode, up to 70 PDUs can be transmitted for one TTI.

F: This field is a flag indicating whether an SID follows or the current SID is the last one. If the F field is set to 0, it is followed by an SID. If it is set to 1, there is no more SID and a MAC-d PDU follows.

Before transmitting the thus-configured transport block on a physical channel, the MAC-hs layer scrambles the transport block in a method known to both the transmitter and receiver by the bit scrambler 302, thereby preventing the non-uniform transmission of HS-PDSCH (High Speed Physical Downlink Shared CHannel) bits.

In the $3^{rd}$ generation communication system, the transmitter transmits a preset pilot signal on the common pilot channel that all users can receive and the receiver estimates channel characteristics, especially fading, using the pilot signal. The estimated channel characteristics are used to recover a signal distorted by fading to a normal signal and also to estimate the pilot to traffic power ratio.

The pilot-to-traffic power ratio estimation is an essential process for demodulation of a signal modulated in a higher-order modulation scheme such as 16 QAm or 64 QAM. If the transmitter tells the receiver the power ratio, the power ratio estimation is not needed. Yet, in a general high-speed packet transmission system like 1xEV-DV or HSDPA using a modulation scheme with an order equal to or higher than 16 QAM, the receiver is supposed to estimate the power ratio to relieve signal load. Receiving the power ratio estimation at the receiver instead of receiving the power ratio by signaling is called blind power ratio detection. In the case where the transmit power of the transmitter is non-uniform, the use of the pilot-to-traffic power ratio in demodulation can cause problems.

The pilot-to-traffic power ratio can be estimated effectively if transmission symbols are uniformly created on a 16 QAM signal constellation. Otherwise, an estimation error of symbols being all 1's or all 0's is generated, resulting in performance degradation. The performance decrease is estimated to be 1.0 to 1.5 dB. Therefore, the bit scrambler 302 is used to overcome the non-uniform transmit power involved in a high-order modulation scheme.

Figure 5:
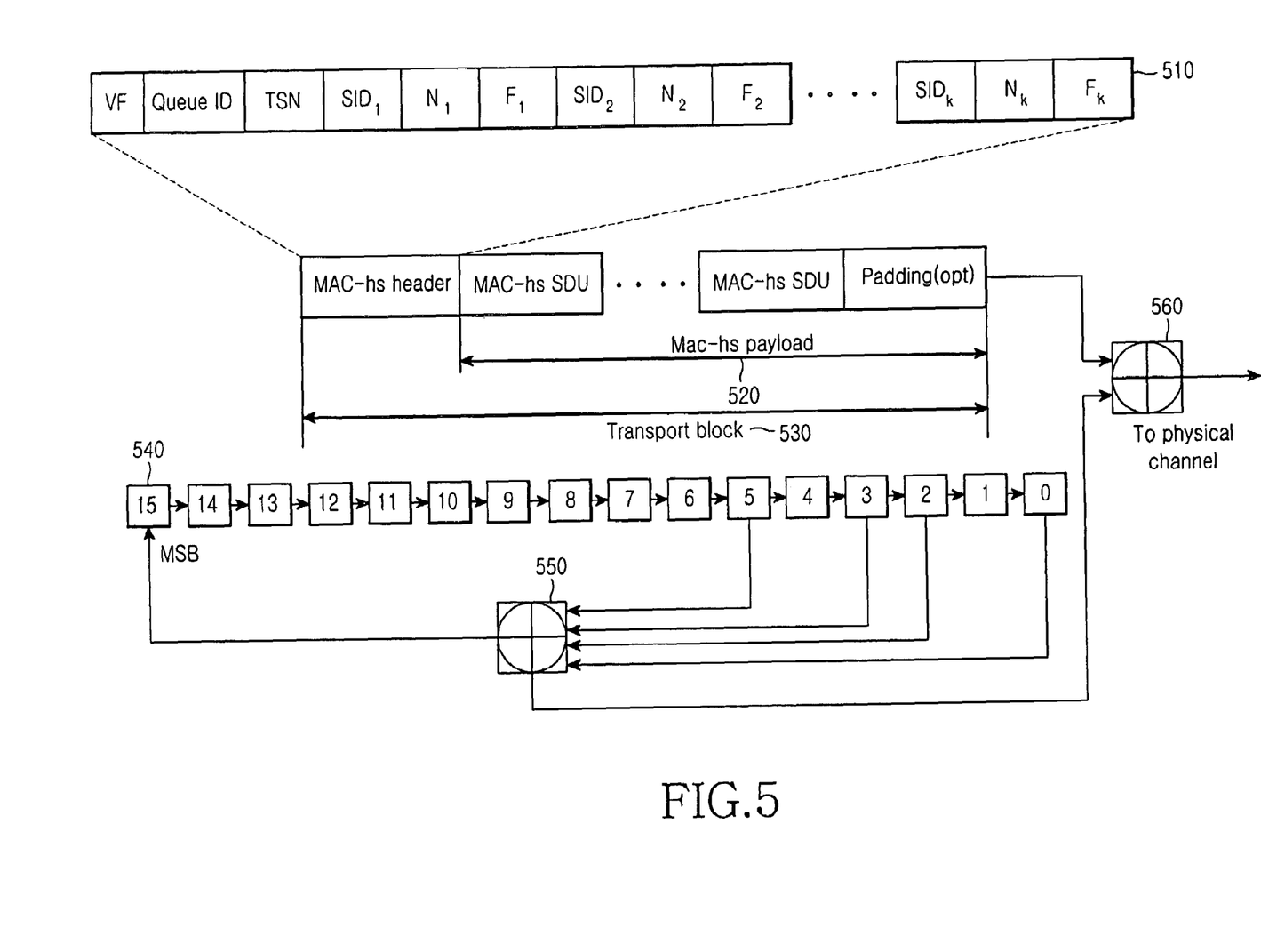
FIG. 5 illustrates a MAC-hs PDU used for high-speed downlink packet transmission and a detailed structure of a scrambler in the transmitter according to an embodiment the present invention.

FIG. 5 illustrates in detail the structure of the bit scrambler 302 according to an embodiment of the present invention.

Referring to FIG. 5, let B input bits of a transport block to the bit scrambler 302 be denoted by $b_{im,1}, b_{im,2}, b_{im,3}, \ldots, b_{im,B}$ and scrambled bits be denoted by $d_{im,1}, d_{im,2}, d_{im,3}, \ldots, d_{im,B}$. The input bits (transport block) 530 is comprised of a MAC-hs header 510 and a MAC-hs payload 520. The MAC-hs header 510 includes a VF, a Queue ID, a TSN, SIDs, N fields, F flags and the MAC-hs payload 520 includes at least one MAC-hs SDU.

A shift register 540 stores a predetermined 16-bit initial value $g=\{g_1, g_2, \ldots, g_{16}\}$. A first summer 550 sums a predetermined number of selected value among the shift register values and feeds back the sum as the most significant bit (MSB) value of the shift register 540. A second summer 560 sums the input bits 530 and the output of the first summer 550 and outputs the sum as scrambled bits. The bit scrambling can be expressed as $$d_{im,k} = (b_{im,k} + y_k) \bmod 2_k \qquad (5)$$

where k is a natural number between 1 and B and $y_k$ is given by $$y_k = 0, \qquad -15 < k < 1 \qquad (6)$$
$$y_k = 1, \qquad r = 1$$
$$y_k = \left(\sum_{x=1}^{16} g_x \cdot y_{k-x}\right) \bmod 2, \quad 1 < k \le B$$

where the initial value $g=\{g_1, g_2, \ldots, g_{16}\}=\{0, 0, 0, 0, 0, 0, 0, 0, 0, 0, 1, 0, 1, 1, 0, 1\}$.

When a non-uniform signal concentrated on 1 or 0 is input, the above bit scrambling converts the input signal to a uniform signal by the function inherent to scrambling.

As described herein, a transmitting apparatus and method for bit-scrambling high-speed packet data using the predetermined scrambling code g for all UEs are proposed. Yet, the description herein is but a mere exemplary application and those skilled in the art can appreciate that additional system performance improvement can be achieved by applying the inventive bit scrambling in various other ways, such as using a UE-specific bit scrambling code in bit scrambling for each UE. For example, the UE-specific bit scrambling code can be a UE ID.

Referring back to FIG. 3, the code block segmenter 306 segments the transport block into blocks of a predetermined size if the CRC-attached transport block exceeds the maximum number of bits for the input of the channel encoder. For example, the maximum number of bits that the channel encoder 108 can receive is 504 for convolutional coding and 5114 for turbo coding.

The channel encoder 308 encodes the input bits in a predetermined coding rate (for example ½ or ¾). If the channel encoder 308 supports a plurality of coding rates through puncturing or repetition by use of a ⅓, ⅙ or ⅕ mother code, it needs to select one of the coding rates.

In a real physical communication system, it is impossible to receive a signal without any distortion or noise from a transmitter. Especially, in a wireless communication system that transmits/receives signals over a wireless network, that system suffers from more serious effects of distortion or noise than a wired network. One effective solution to the problem is error correction coding. The error correction coding is a scheme of compensating for the effects of distortion or noise by transmitting coded bits comprising a systematic part and a parity part derived from the systematic part. The systematic part includes information bits to be transmitted and the parity part includes parity bits used to correct transmission errors of the information bits at decoding at a receiver.

A future-generation mobile communication requires a more robust channel coding technique to transmit high-speed multimedia data more reliably. The channel coding technique using a channel encoder offers performance close to the Shannon limit in terms of bit error rate (BER) even under low SNR.

The coded bits are rate-matched in the HARQ functionality block 310. The rate matching is performed through repetition and puncturing of the coded bits in the case where the number of the coded bits is not equal to that of transmittable bits over the air. The interleaver 312 interleaves the rate-matched coded bits. The interleaving aims to minimize data loss caused by burst errors during data transmission.

The constellation rearranger 314 rearranges the interleaved coded bits. The modulator 316 maps the rearranged bits to modulation symbols in a M-ary PSK or an M-ary QAM and transmits them through the transmit antenna 320. The constellation rearranger 314 separates the interleaved coded bits into the systematic part and the parity part and allocates the systematic part to a high-reliability position and the parity part to a low-reliability position. Also, the constellation rearranger 314 distinguishes initial transmission bits from retransmission bits and maps the initial transmission bits to modulation symbols with a low error probability and the retransmission bits to modulation symbols with a high error probability.

The controller 318 controls the coding rate of the channel encoder 308, the rate matching of the HARQ functionality block 310, and the modulation scheme of the modulator 316 according to the current radio channel status. In an HSDPA wireless communication system, the controller 318 supports the AMCS.

In the transmitter, there is no distinction made in the coded bits from the channel encoder between the systematic part and the parity part. However, the systematic bits and the parity bits do differ in priority. When errors are generated in transmission data at a certain error rate, error generation in the parity bits, rather than the systematic bits, is favorable to decoding at the receiver. This can be explained by the fact that the systematic bits are actual information bits and the parity bits are redundant bits added to compensate for transmission errors at decoding. Therefore, the systematic bits are transmitted at high-reliability bit positions and the parity bits at low-reliability bit positions, so that the error probability of the systematic bits is reduced and thus system performance is increased.

Along with the transmission of the systematic part and the parity part according to bit reliability, in another exemplary embodiment of the present invention it is possible that, at retransmission, the systematic part is exchanged with the parity part in the coded bits, or the coded bits are mapped to modulation symbols in a different region from an initial transmission by inverting the parity part, or the coded bits are rearranged in the packet. These operations can be performed by the constellation rearranger 314.

Figure 6:
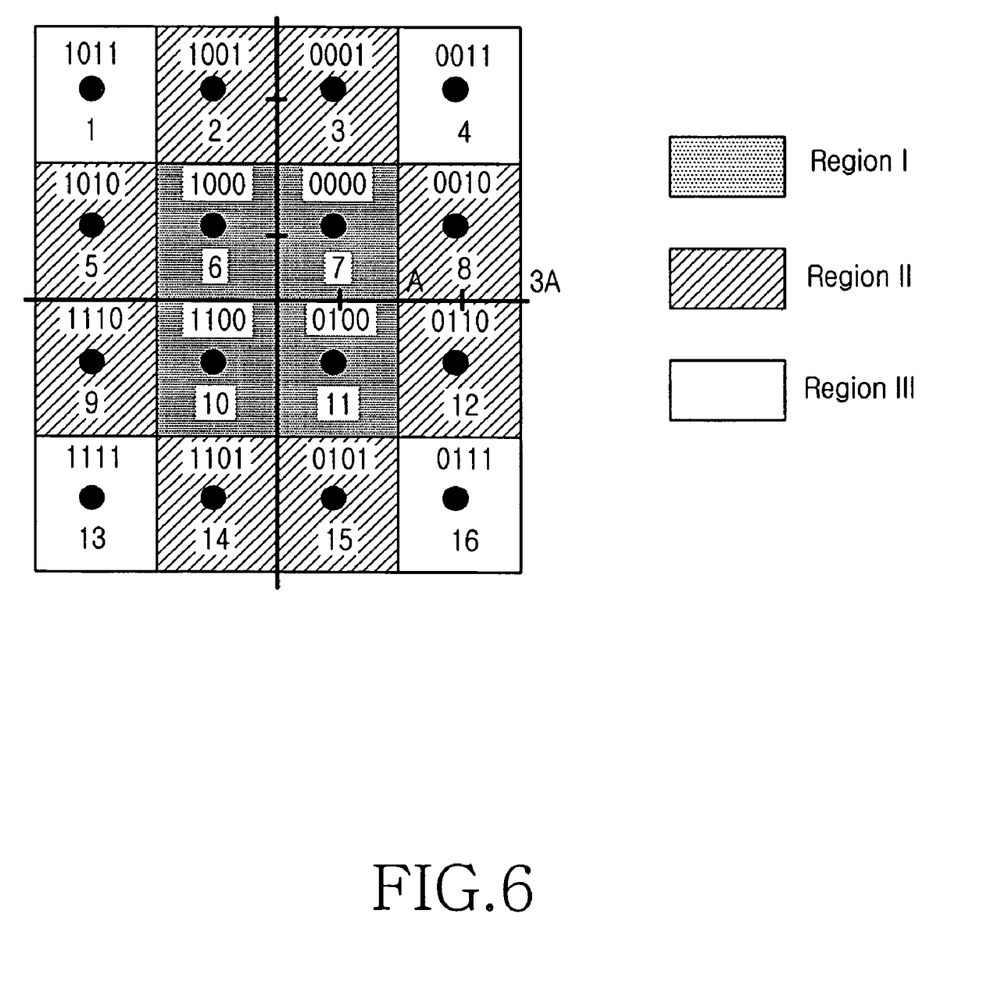
FIG. 6 exemplarity illustrates a 16 QAM signal constellation in a CDMA mobile communication system according to an embodiment the present invention.

A detailed description will be made of the operation of the constellation rearranger 314 of FIG. 3. In 16 QAM, four coded bits are mapped to one of 16 available signal points. FIG. 6 illustrates an example of a 16 QAM signal constellation. As illustrated in FIG. 6, each signal point is mapped to four coded bits.

Referring to FIG. 6, the 16 signal points can be divided into three regions, Region I has the highest error probability, Region III has the lowest error probability, and Region II has a medium error probability. Therefore, it can be seen that symbols at signal points 6, 7, 10 and 11 of Region I have a higher error probability than signal points in the other regions. Continuous transmission of symbols in a bad environment (e.g. the areas of higher error probability) can cause degradation of system performance. The system performance can be improved by inverting bits of a retransmission packet and thus transmitting the retransmission packet in a different region from an initial transmission packet.

An M-ary modulation symbol is comprised of $\log_2 M$ bits. In the M-ary modulation symbol, the bits differ in reliability. For example, a 16 QAM symbol corresponds to four coded bits. The first two bits of are mapped to high-reliability bits, whereas the last two bits to low-reliability bits. If retransmitted bits are continuously transmitted with the same reliability (that is, some of them having high reliability and the others having low reliability), the error probability of a certain part of the bits is increased.

Therefore, the constellation rearranger 314 shifts input bits by a predetermined number of bits at a retransmission so that bits transmitted with low reliability can be retransmitted with high reliability. This renders the log likelihood ratios (LLRs) of the turbo decoder input bits homogeneous, thereby improving decoding performance. The modulation symbols are transmitted through the transmit antenna 320 after the above-described operation.

Figure 7:
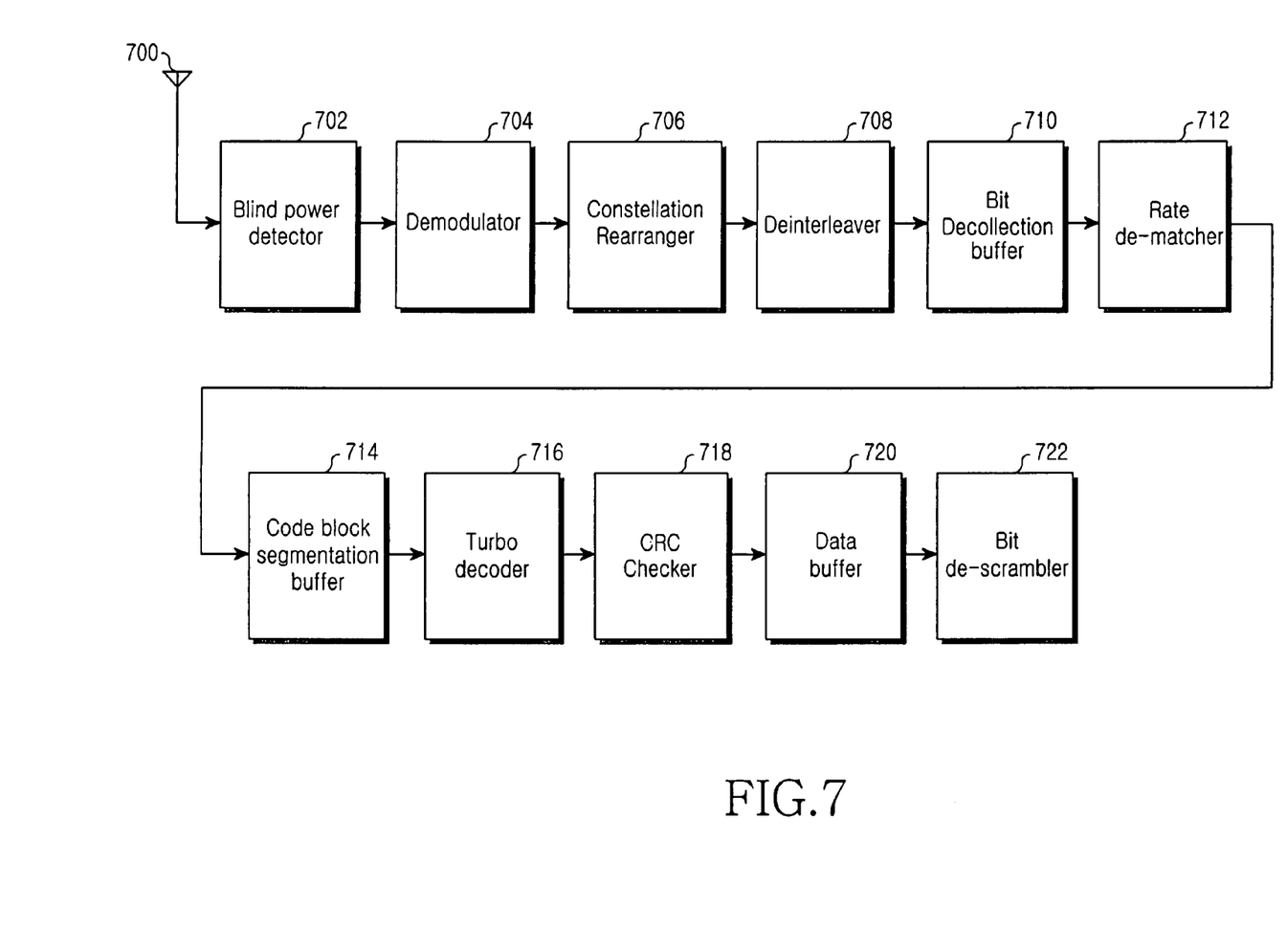
FIG. 7 is a block diagram of a receiver in the mobile communication system for high-speed downlink packet transmission according to an embodiment of the present invention.

FIG. 7 is a block diagram of a receiver for high-speed packet reception according to an embodiment of the present invention. As illustrated in FIG. 7, the receiver is comprised of a receive antenna 700, a BPD 702, a demodulator 704, a constellation rearranger 706, a deinterleaver 708, a bit decollection buffer 710, a rate dematcher 712, a code block desegmentation buffer 714, a turbo decoder 716, a CRC checker 718, a data buffer 720, and a bit descrambler 722.

Referring to FIG. 7, the BPD 202 estimates the pilot-to-traffic power ratio of a signal received through the receive antenna 700. The demodulator 704 extracts a bit stream from the input symbol sequence based on the estimated power ratio. The constellation rearranger 706 rearranges the bit stream to output coded bits. The deinterleaver 708 deinterleaves the coded bits in correspondence with the interleaving of the interleaver 312 in the transmitter. The deinterleaved bits are applied to the input of the turbo decoder 716 via the bit decollection buffer 710, the rate dematcher 712, and the code block desegmentation buffer 714. The turbo decoder 716 extracts information bits by separating the received bits into a systematic part and a parity part.

The turbo decoder 716 outputs the information bits through iterative decoding. As a criterion to terminate the iterative decoding, a maximum number of decoding iterations, a maximum likelihood ratio, or a CRC check can be used. Conventionally, bit scrambling is performed on a CRC-attached signal so that the receiver cannot perform a CRC check, using known CRC bits before bit descrambling. Hence, the CRC check cannot be used as a criterion to terminate the decoding iterations. On the contrary, the embodiments of the present invention enable a CRC check at each decoding iteration so that the CRC check can be used as a criterion to terminate the iterative decoding. Furthermore, according to the embodiments of the present invention, the CRC check can be performed without the CRC checker 718, according to designer selection, in view of the nature of the turbo decoder 716 using the CRC check as the criterion.

The CRC checker 718 determines an acknowledge/non-acknowledgment (ACK/NACK) by checking the CRC of the information bits. In the case of an ACK, the decoded bits are buffered in the data buffer 720 and bit-descrambled in the bit descrambler 722 in correspondence with the bit scrambling of the bit scrambler 302 of a higher layer (that is, the MAC-hs layer).

By using the CRC check-based iterative decoding termination scheme for a physical channel, the receiver of the present invention detects a signal for which no more decoding iterations are required. Consequently, power consumption is reduced and throughput is increased in the receiver.

Figure 8:
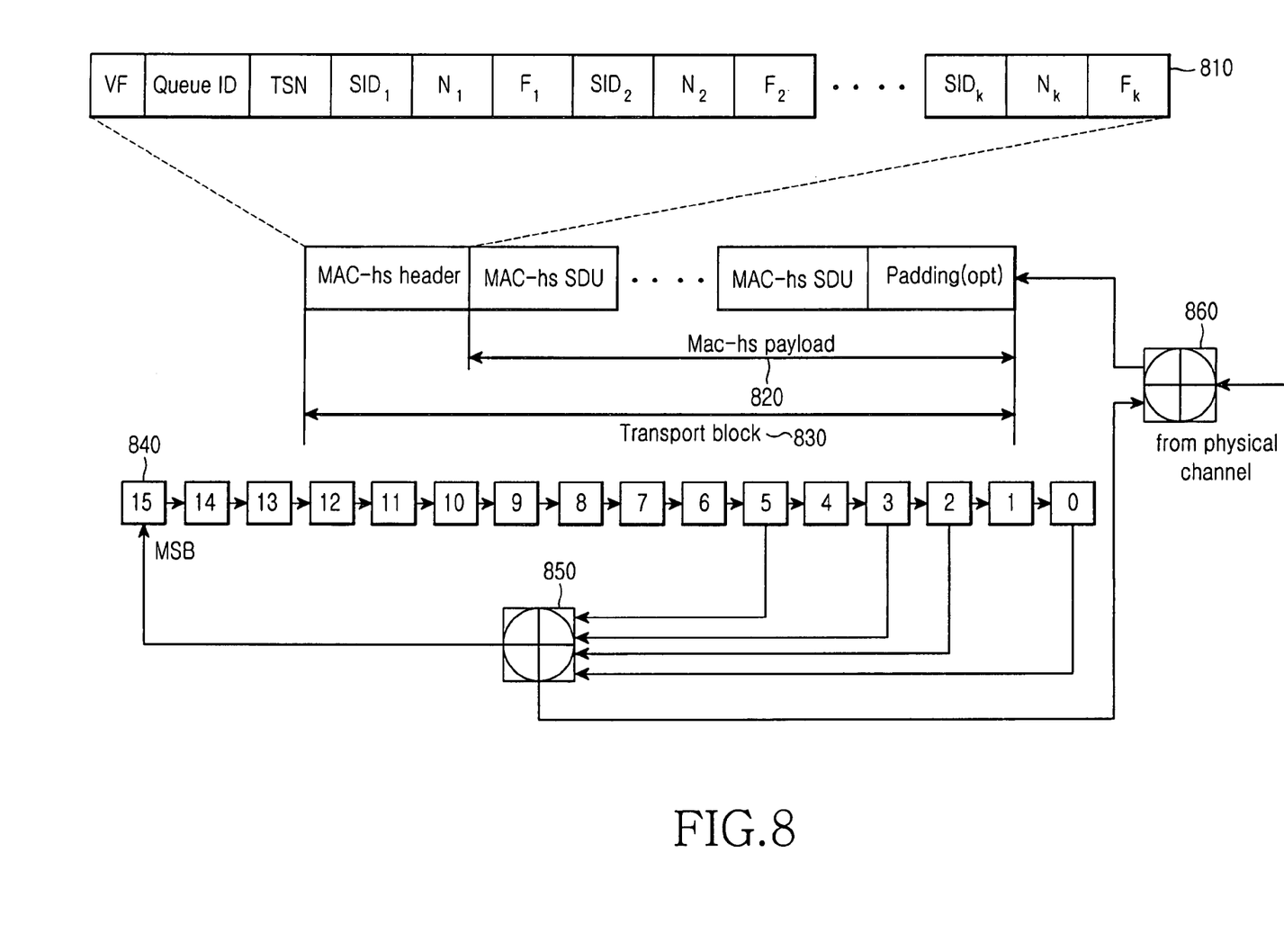
FIG. 8 illustrates a MAC-hs PDU used for high-speed downlink packet transmission received in the receiver and a detailed structure of a descrambler in the receiver according to an embodiment the present invention.

FIG. 8 is a detailed block diagram of the bit descrambler 722 in the receiver illustrated in FIG. 7. The bit descrambler 722 operates as follows.

Referring to FIG. 8, a shift register 840 stores a predetermined initial value $g=\{g_1, g_2, \ldots, g_{16}\}$. A first summer 850 sums a predetermined number of selected values among the shift register values and feeds back the sum as the MSB value of the shift register 840. A second summer 860 sums bits received from the physical layer and the output of the first summer 850 and outputs the sum as descrambled bits (or the transport block) 830.

In the embodiment of the present invention, high-speed packet data is bit-scrambled using the predetermined scrambling code g for all UEs this is only one exemplary application and it should be apparent to those skilled in the art of the present invention that additional system performance improvement can be achieved by applying the inventive bit scrambling in various ways such as using a UE-specific bit scrambling code in bit scrambling for each UE. For example, the UE-specific bit scrambling code can be a UE ID.

As described earlier, the descrambled bits 830 are comprised of a MAC-hs header 810 and a MAC-hs payload 820. The MAC-hs header 810 includes a VF, a Queue ID, a TSN, SIDs, N fields, F flags and the MAC-hs payload 820 includes at least one MAC-hs SDU.

Several benefits arise from use of the embodiments of the present invention as described above. The embodiments of the present invention can perform bit scrambling to solve the problem of non-uniform transmit power involved in high-order modulation before CRC attachment and can perform bit descrambling after a CRC check, for high-speed packet data transmission/reception in a WCDMA wireless communication system. This enables termination of iterative decoding at a turbo decoder according to the CRC check. Hence, power consumption is reduced and throughput is increased at a receiver.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting packet data in a mobile communication system using a hybrid automatic retransmission request (HARQ) scheme and a high-order modulation scheme, comprising:

bit-scrambling a plurality of data bits included in a transport block;

attaching an error correction code to the bit-scrambled transport block;

channel-encoding the error correction code-attached transport block on a per-coding block basis; and modulating the channel-coded transport block and transmitting the modulated transport block;

wherein the bit scrambling comprises:

summing in a first summation device a predetermined number of selected values of an initial value stored in a shift register device in a first summation device;

feeding the sum of the predetermined number of selected values of an initial value to a most significant bit of the shift register device;

summing the transport block and the sum of the predetermined number of selected values of an initial value in a second summation device;

shifting the bits of the shift register device and feeding a predetermined number of selected values from the shift register device to the first summation device; and continuing to sum the transport block with the sum of the first summation device to output scrambled bits.

2. The method of claim 1, wherein the step of bit scrambling comprises:

bit-scrambling the data bits with a predetermined common scrambling code.

3. The method of claim 1, wherein the step of bit scrambling comprises:

bit-scrambling the data bits with a predetermined user equipment (UE) specific scrambling code.

4. An apparatus for transmitting packet data in a mobile communication system using hybrid automatic retransmission request (HARQ) scheme and a high-order modulation scheme, comprising:

a bit scrambler for bit-scrambling data bits included in a transport block;

an error correction code adder for attaching an error correction code to the bit-scrambled transport block;

a channel encoder for channel-encoding the error correction code-attached transport block on a per-coding block basis; and a modulator for modulating the channel-coded transport block, wherein the bit scrambler comprises:

a shift register device for initially being loaded with a set of selected values;

a first summation device for summing a predetermined number of selected bits of the register device and for outputting a first sum into a most significant bit of the shift register device; and a second summation device for summing the output of the first summation device and the transport block.

5. The apparatus of claim 4, wherein the bit scrambler bit-scrambles the data bits with a predetermined common scrambling code.

6. The apparatus of claim 4, wherein the bit scrambler bit-scrambles the data bits with a predetermined user equipment (UE) specific scrambling code.

7. A method of receiving packet data in a mobile communication system using a hybrid automatic retransmission request (HARQ) scheme and a high-order modulation scheme, comprising:

demodulating a received signal in correspondence with a modulation scheme used in a transmitter;

converting the demodulated data into at least one or more coding blocks, channel-decoding each of the at least one or more coding blocks, and outputting a plurality of data bits;

determining whether errors are occurred in the plurality of data bits using an error correction code included in the data bits and iteratively decoding the coding block until no errors are detected in the determination; and bit-descrambling the plurality of data bits except the error correction code, if no errors are detected in the determination;

where the bit descramblmg comprises:

receiving the plurality of data bits in a second summation device;

summing a predetermined number of selected values of an initial value stored in a shift register device in a first summation device;

summing a first bit of the plurality of data bits and a first sum of the predetermined number of selected values of an initial value in the second summation device to output a first descrambled bit;

outputting the sum of the predetermined number of selected values of the bit register to a most significant bit of the shift register device;

shifting the bits of the shift register device and feeding a predetermined number of selected values from the shift register device to the first summation device; and continuing to sum the received plurality of data bits in a second summation device along with the sum from the first summation device to output descrambled data bits.

8. An apparatus for receiving packet data in a mobile communication system using a hybrid automatic retransmission request (HARQ) scheme and a high-order modulation scheme, comprising:

a demodulator for demodulating a received signal in correspondence with a modulation scheme used in a transmitter;

a channel decoder for converting the demodulated data to coding blocks, channel-decoding each of the coding blocks, outputting a plurality of data bits, and iteratively decoding the coding block until no errors are detected in the coding block;

an error checker for determining whether errors are generated in the plurality of data bits using an error correction code included in the data bits and providing the determination result to the channel decoder; and a bit descrambler for bit-descrambling the plurality of data bits except the error correction code, if no errors are detected;

wherein the bit descrambler comprises:

a shift register device for initially being loaded with a set of values;

a first summation device for summing a predetermined number of selected bits of the shift register device and for outputting a first sum into a most significant bit of the bit shift register; and a second summation device for summing the output of the first summation device and a received plurality of data bits.

* * * * *